United States Patent
Elias et al.

(10) Patent No.: US 10,019,603 B2
(45) Date of Patent: Jul. 10, 2018

(54) SECURED MEMORY SYSTEM AND METHOD THEREFOR

(71) Applicant: Synopsys, Inc., Mountain View, CA (US)

(72) Inventors: Andrew Alexander Elias, Ottawa (CA); Neil Farquhar Hamilton, Kanata (CA); Neil Leckett, Ottawa (CA); Michael James Lewis, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 21 days.

(21) Appl. No.: 14/254,254

(22) Filed: Apr. 16, 2014

(65) Prior Publication Data
US 2015/0301957 A1  Oct. 22, 2015

(51) Int. Cl.
*G06F 21/72* (2013.01)
*G06F 21/64* (2013.01)
*G06F 21/79* (2013.01)

(52) U.S. Cl.
CPC .............. *G06F 21/72* (2013.01); *G06F 21/64* (2013.01); *G06F 21/79* (2013.01); *G06F 2212/1052* (2013.01)

(58) Field of Classification Search
None
See application file for complete search history.

(56) References Cited

U.S. PATENT DOCUMENTS

| | | | |
|---|---|---|---|
| 5,584,012 A * | 12/1996 | Kojima | G06F 3/0601 711/122 |
| 7,523,319 B2 | 4/2009 | Challener et al. | |
| 2004/0003246 A1 * | 1/2004 | Hopkins | H04Q 9/0625 713/168 |
| 2006/0161773 A1 * | 7/2006 | Okazaki et al. | 713/168 |
| 2008/0109660 A1 | 5/2008 | Mitra | |
| 2009/0089337 A1 | 4/2009 | Perlin et al. | |
| 2010/0199042 A1 * | 8/2010 | Bates et al. | 711/114 |
| 2011/0219241 A1 * | 9/2011 | Takeda | 713/193 |
| 2011/0279242 A1 * | 11/2011 | Krawczewicz | G06K 19/0701 340/10.6 |
| 2011/0293097 A1 | 12/2011 | Maino et al. | |
| 2013/0067245 A1 | 3/2013 | Horovitz et al. | |
| 2013/0185167 A1 * | 7/2013 | Mestre | G06Q 20/20 705/21 |
| 2014/0223192 A1 * | 8/2014 | Dent et al. | 713/189 |
| 2014/0237611 A1 * | 8/2014 | Dent | 726/26 |
| 2015/0012737 A1 * | 1/2015 | Newell | 713/2 |

OTHER PUBLICATIONS

Written Opinion of the ISA corresponding to co-pending International Patent Application No. PCT/CA2014/050382, dated Jul. 16, 2014 (8 pages).
International Search Report corresponding to co-pending International Patent Application No. PCT/CA2014/050382, dated Jul. 16, 2014 (4 pages).
Athina, Nickitas-Etienne, International Preliminary Report on Patentability received from WIPO dated Oct. 18, 2016 for appln. No. PCT/CA2014/050382, 8 pgs.

* cited by examiner

*Primary Examiner* — Benjamin E Lanier

(74) *Attorney, Agent, or Firm* — Jaquez Land Greenhaus LLP; Bruce W. Greenhaus, Esq.

(57) ABSTRACT

There is disclosed a cache memory controller for storing cache data within a cache, the cache data comprising an unsecured version data to corresponding secured first data.

6 Claims, 5 Drawing Sheets

SECURED MEMORY SYSTEM AND METHOD THEREFOR

FIELD OF THE INVENTION

The invention relates to the field of data security and more specifically to the field of secure memory.

BACKGROUND OF THE INVENTION

Secure memory, located inside an integrated circuit (IC), for code and/or data storage requires dedicated, isolated memory elements which cannot be shared with other resources because of they need to remain secure. Located inside an IC, the memory elements often represent a significant size and cost impact.

Critical executable code generally needs to be validated before execution. To guarantee its integrity, the entire image of the critical executable code is stored within large areas of on-chip memory. Using on-chip memory to store the critical executable code also makes some updates such as patches and enhancements requiring additional memory more difficult.

A known solution is to protect the entire image with one or more Message Authentication Code (MAC) tags. A provably secure smaller code segment, for example, is loadable from an on-chip ROM and is used to validate a code segment stored in external memory before releasing it to the processor. In the external storage case, the image must not be modifiable by an outside entity, for example an attacker, after the validation of the code segment. If the validated code resides in external memory, it is possible for an attacker to modify the image after the MAC validation process has validated the image, thus allowing the processor to execute unvalidated code.

Another solution for securing memory utilizes memory transactions that are secure. This approach requires specialized memory controllers that understand the difference between two types of transactions—secure and insecure as well as peripherals capable of generating these types of transactions. Further, secure memory though it protects memory access transactions, does not address problems relating to attacks by modification of data within external memory.

Another solution to security of critical executable code involves encrypting all the code and related data stored within unsecured memory where the CPU performs decryption when executing the code or accessing the data. However, decryption is computationally expensive and the system performance is often substantially affected by the additional execution of decryption processes. Existing solutions tend to have a coarse-grained MAC, for example the entire image is encrypted or the image is subdivided into several smaller segments—although still relatively large. These are then verified one or more times in external memory. If the code is modified by an attacker after a MAC validation has been completed, the processor executes that code until the next MAC revalidation is performed; thus, tampered code is executed until a further MAC validation occurs. If the code was tampered with, the next validation will fail, but by that time malicious code may have already been executed.

Secure memory cannot be located outside of a processor IC, for example in low cost SDRAM, as the interconnections are externally accessible and can be easily probed by an attacker to observe and possibly modify the data. Therefore the image to be validated needs to be copied to a large protected on-chip location solely under the control of the processor running the validation process. Otherwise, security boundaries have to be physically extended to include the external unsecured memory, which is not practical.

There is a need to efficiently encrypt/decrypt code and/or data located in external memory such that the accessible interconnections can no longer be tampered with to result in insecure code.

SUMMARY OF THE INVENTION

According to an aspect of at least one embodiment of the disclosure, there is provided a circuit comprising: a cache memory having memory therein secured against tampering; a first memory; and, a cache controller having a first circuit for storing in a form secure from tampering and within the first memory second data corresponding to first data stored within the cache memory in plain text for use by a processor associated with the cache controller.

According to an aspect of at least one embodiment of the disclosure, there is provided a circuit comprising: a cache memory having memory therein secured against tampering; a first memory; and, a cache controller having a first circuit for validating first data within the first memory prior to caching said first data within the cache memory, the entire first data validated and stored within the cache memory in plain text, the entire first data sized for use with the caching process of the cache controller, wherein each secured first data is sized as a block of data within a process of the cache controller.

According to an aspect of at least one embodiment of the disclosure, there is provided a method comprising: caching data from unsecure storage comprising: validating the first data within the unsecure storage; storing an unsecured version of the first data within cache memory in correspondence with the first data; and when the cache is flushed, securing the cached unsecure data against tampering and updating the first data with the secured cached unsecured data.

According to an aspect of at least one embodiment of the disclosure, there is provided a method comprising: storing cache data within a cache; when the cache is flushed, ciphering the cache data to form hash data; storing first data comprising the cache data within an external memory in association with the cache data; and storing the hash data in association with the first data for use in validating the first data against tampering.

BRIEF DESCRIPTION OF THE DRAWINGS

Embodiments of the disclosed method and apparatus will now be described in conjunction with the following drawings, in which.

DETAILED DESCRIPTION

Figure 1:
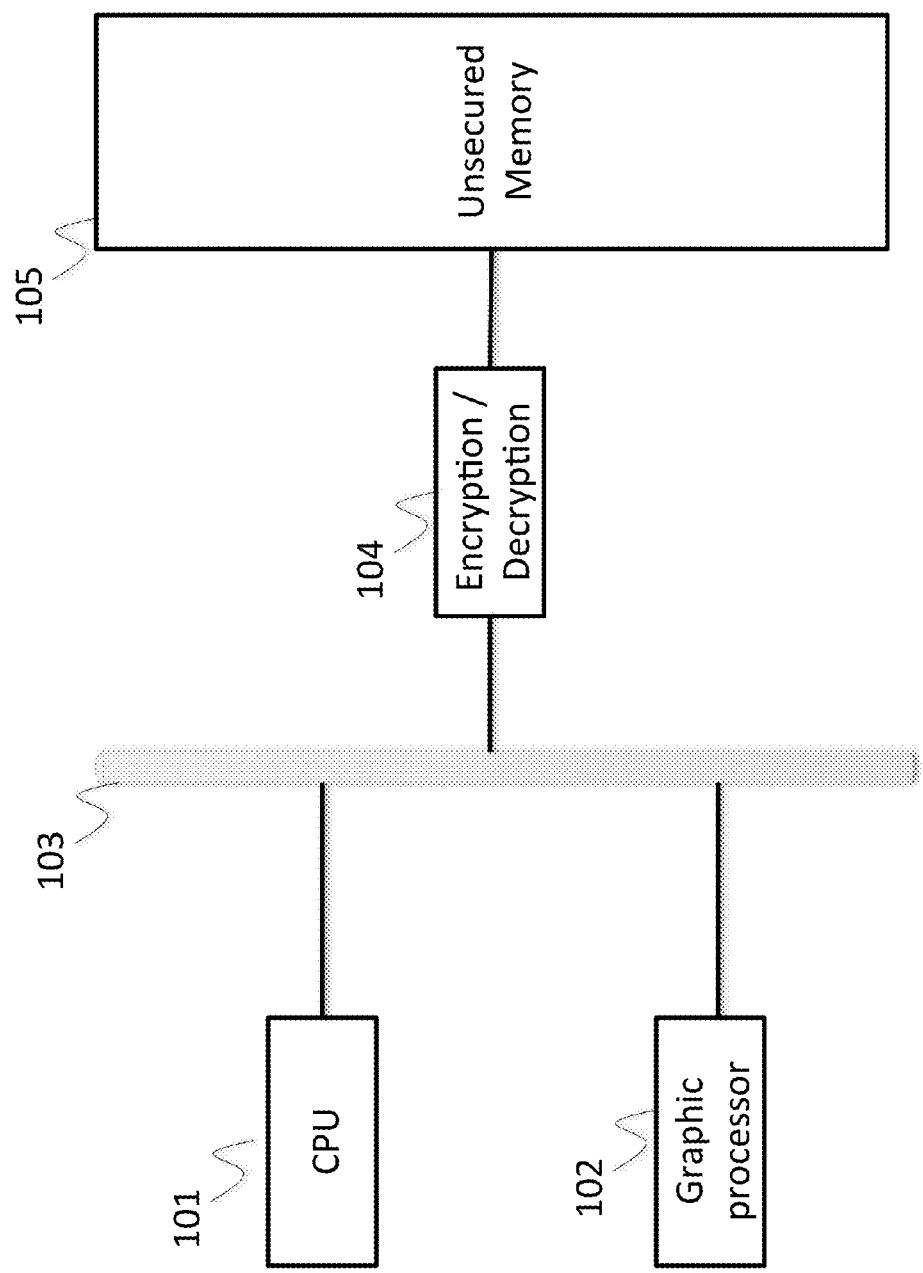
FIG. 1 illustrates a prior art system where encryption/decryption is done externally from the processor.

FIG. 1 illustrates a prior art method of securing external memory storage. Here, all data written to external memory is encrypted when it leaves the processor(s) or prior to leaving the processor and all data is decrypted when read by the processor(s). With the illustrated system, a lot of processing cycles are consumed ciphering, encrypting or decrypting, data, which results in dramatically reduced performance both due to increased power consumption and due to increased processing time or processor circuit space.

Figure 2:
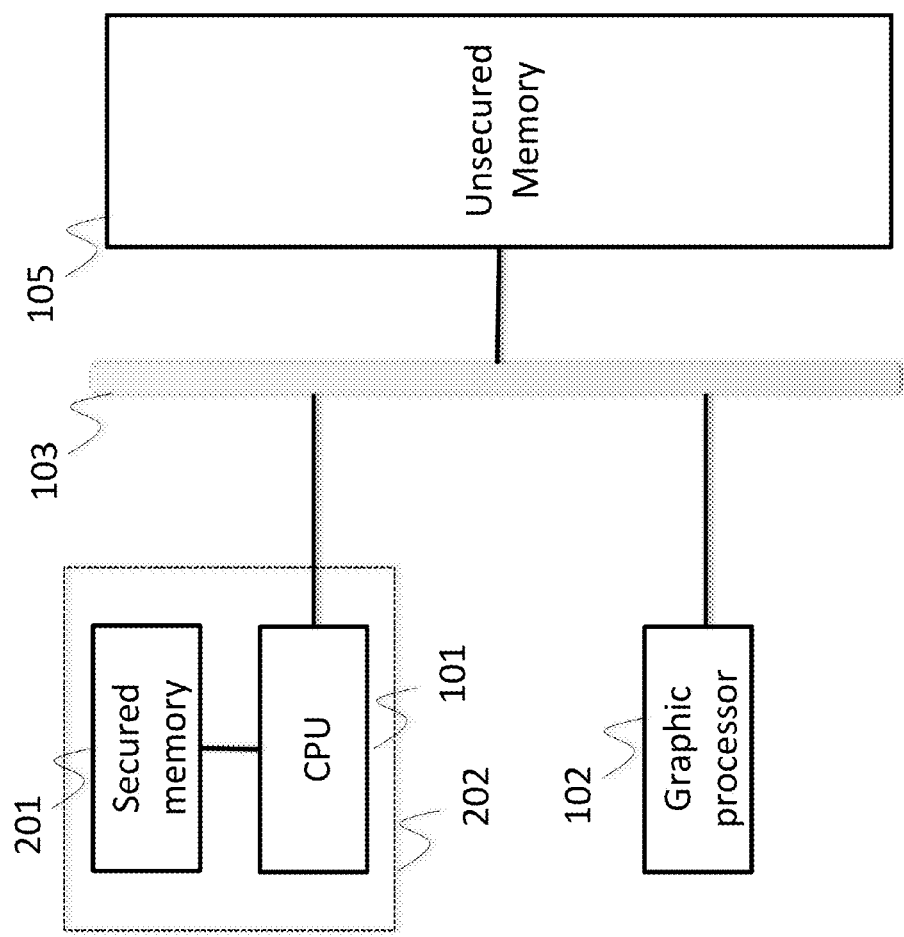
FIG. 2 illustrates a prior art system where the secured memory is located on the processor chip.

FIG. 2 illustrates another prior art method of securing memory. Here, the secure memory is internal to the processing circuit—integrated therewith. All data is brought into the internal storage where it is used. This allows data to be secured against tampering outside the processor, and once stored within the processor in secure memory, to be safe from tampering. Unfortunately, this requires very large internal memory, and further, eliminates many of the advantages of external memory such as price, mass production, upgradability, etc. Further, memory management is now a task that must be designed into the processor circuit.

Figure 3:
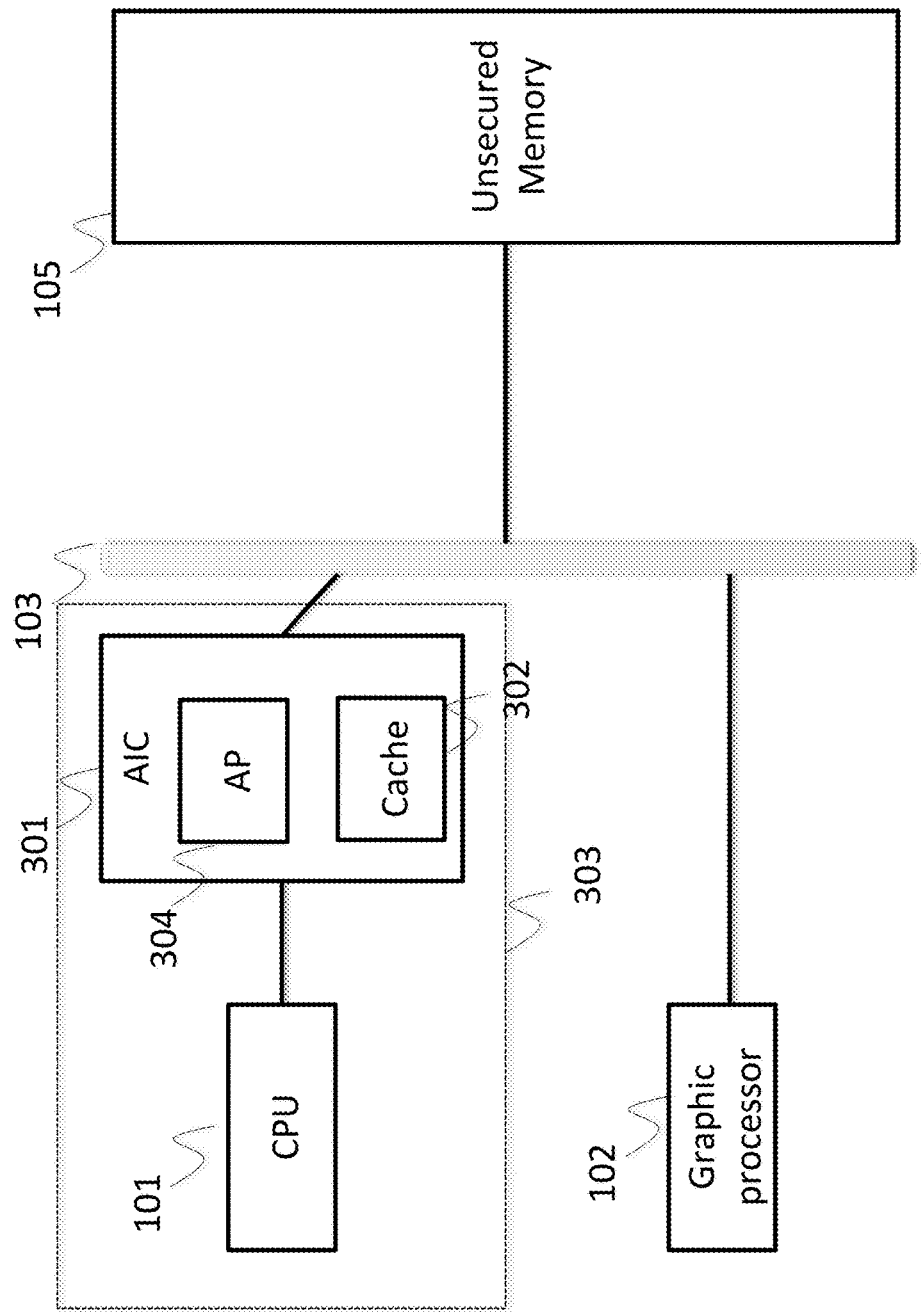
FIG. 3 illustrates one embodiment of the system applied to a typical computing system architecture.

FIG. 3 illustrates one embodiment of an efficient on-chip secure memory access, in which a secure cache is attached to a peripheral. For example, an Advanced Integrity Controller (AIC) 301 cache 302 is combined on integrated circuit (chip) 303 with a processor in the form of CPU 101. The cache 302 is generally a small fast memory integrated with the processor 101.

The AIC 301 is also useful for caching other types of data such as blocks of video from a Graphics Processing Unit (GPU) or from a display controller thereby obviating secure versions of those and other memory using peripherals or integrated circuit blocks.

In one embodiment, the cache 302 of AIC 301 is combined with an authentication processor (AP) 304 to ensure that the processor 101 only executes valid code—code that has been and is known to be validated. The code is stored in the unsecured memory 105 with a plurality of MAC tags which are used for validation. The code is optionally encrypted for example with an AES process. Alternatively another encryption process or technology is used wherein an encryption key is shared with the AP 304. When a cache miss occurs, a cache line and associated MAC tag fetch is performed by the AP 304 from the unsecured memory 105 over a bus 103. The AP relies upon the MAC tag to validate the retrieved cache line and once validated stores it in the secured cache 302 which is local. During the cache line fetch, the processor 101 is held using wait states or an equivalent mechanism. Alternatively, the processor executes another thread or another process until the cache line fetch operation is completed. The AP 304 performs MAC validation, and when necessary decryption, on the retreived cache line fetched from external memory. Optionally, the process also supports processing of other code or data stored, for example code or data that does not require validation in the unsecured memory 105, by the processor 101. Only the code/data that requires validation and that is previously secured against tampering need be validated using the AP 304. Once validated, the data is stored in the unsecured memory in association with a secure tag in the form of a MAC tag. Use of an efficient tamper detection process, results in an effective method of storing all data in unsecure memory when not in use and transferring data to the cache for use by the processor and validating the data during transfer thereof. Further, by validating small blocks of data having a size for use with a cache process being used, the validated stored data operates analogously to data used from within an unsecured cache.

In some embodiments, only validated code/data is stored in the internal cache memory 302 and subsequently accessible to the processor 101. When fetching a line along with its corresponding MAC, the AP 304 recalculates the MAC for the cache line and compares it to the retrieved MAC tag. If the recomputed MAC does not match the corresponding MAC fetched with the cache line, the process is halted, for example processor 101 is halted. For example a STOP instruction executed. Alternatively, the processor 101 is looped in place or placed in a wait state. Further alternatively, the processor is cleared and reset. If the retrieved and recomputed MAC match, the processor accesses the data from the cache 302. With this mechanism, the processor 101 is limited to executing validated code. Alternatively, the fetched cache line is stored in temporary memory for validation and is only stored in the cache if and when validated. Thus, the processor remains unable to continue execution, it was paused during the cache miss, as the cache line is not retrieved successfully.

Similar to existing cache systems, when the data location that the processor wishes to fetch data from is already stored in the cache, the data is returned with minimal delay and all benefits of data or op code caching are experienced. Since the cache memory is secured and only accessible from within the processor and from within the cache controller, any data stored therein is known to be validated and is modifiable only by the secure process in execution.

If an attacker attempts to circumvent the security of the secure cache, for example by modifying an image of the externally stored code, the next time that section of code/data is read from the external memory, for example upon occurrence of a cache miss, validation fails—a discrepancy is detected between the cryptographically secure associated MAC tag and the recomputed one—resulting in at least one of the process and the processor being halted.

The image and its associated MAC tags form a data source that can be validated and the secure caching of data from the data source supports relatively efficient and fast processing of an application and its data. The validated data is formed in the present embodiment from known data. For example, an executable image is secured by a trusted party with a separate cryptographic tool which uses keys to validate the image. Alternatively, the executable image is stored in secure read only memory such that it is known to be tamper proof. Further alternatively, it is retrieved from a trusted source. Since a copy of the keys used for MAC tag generation are stored securely on-chip, the keys remain secret from an attacker. Thus, when the keys are never exported from the integrated processing chip, compromising the code which will be internally validated by the disclosed method and apparatus and subsequently released to the processor for execution.

Figure 4:
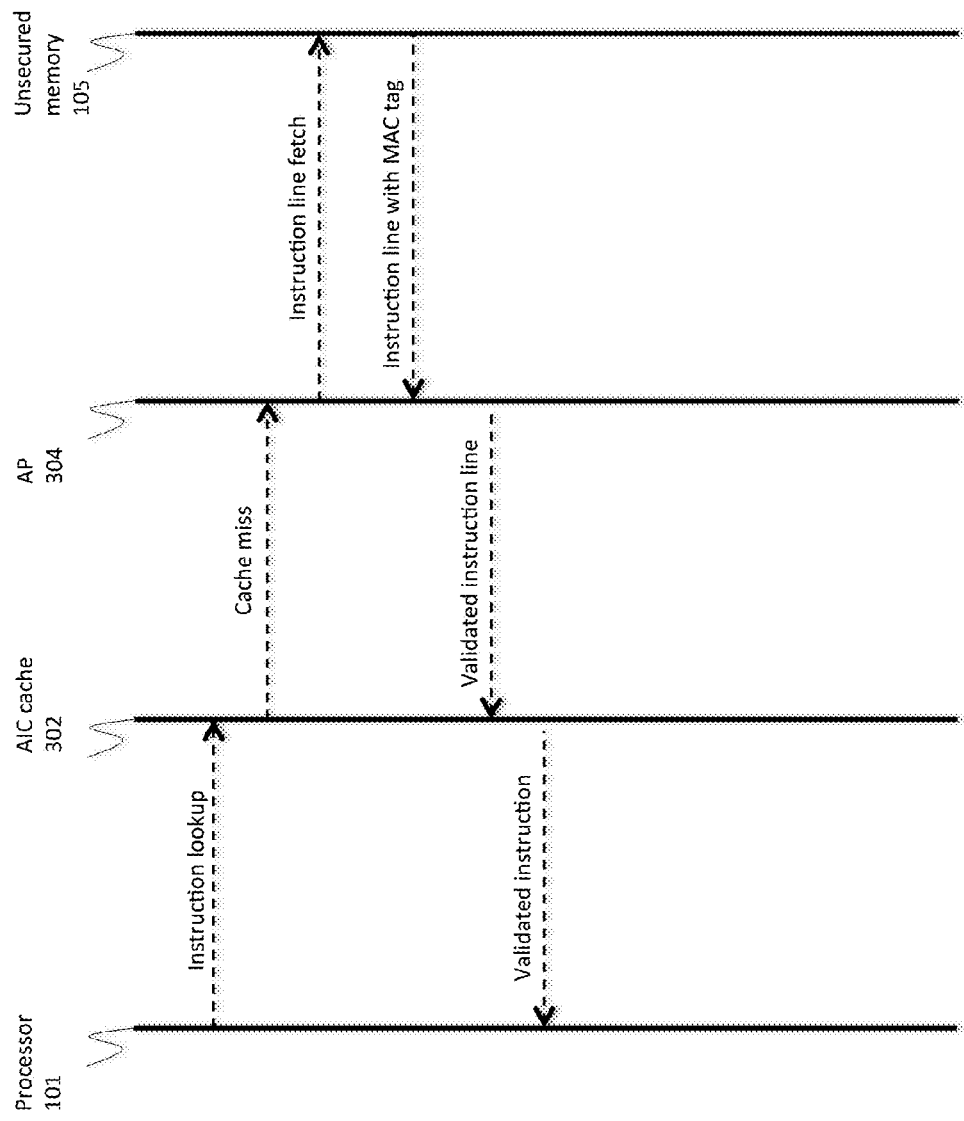
FIG. 4 illustrates the flow of information for code transfer.

FIG. 4 illustrates an example of the information flow for a cache miss. The processor 101 performs an instruction lookup in the AIC cache 302. If a cache miss is detected, the AP 304 fetches the instruction line from the unsecured memory 105. The instruction line, along with validating data in the form of a MAC tag is returned to the AP 304. The AP 304 validates the instruction line and stores it in the AIC cache 302. The processor 101 then executes the validated instruction line. Alternatively, two or more instruction lines are grouped together within a same block of data for being validated and cached together.

Figure 5:
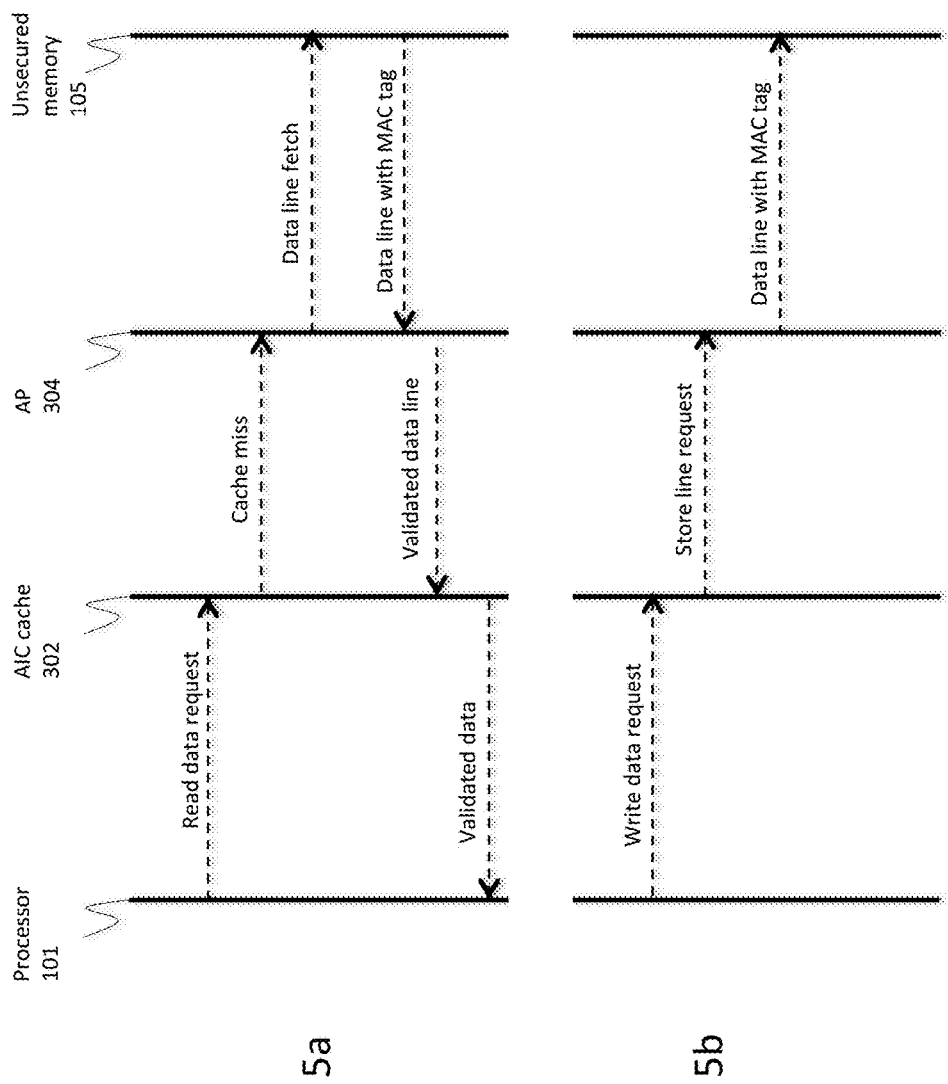
FIG. 5 illustrates the flow of information for read/write of data to memory.

FIG. 5 illustrates an example of a read operation (5a) and a write operation (5b) to unsecured memory. When the processor 101 performs a read data request for reading data from the AIC cache 302 and a cache miss occurs, the AP 304 fetches the data line in the unsecured memory 105. Alternatively, the AP 304 fetches several data lines in a block. The retrieved data is returned with a MAC tag to the AP 304. The AP 304 performs validation of the retrieved data and stores it in the AIC cache 302 once validated. The processor 101 can then access the validated data from the AIC cache 302. In some embodiments, the data is stored within the AIC cache, but when validation fails, the processing is halted or reset. In other embodiments, data is only stored within the AIC cache 302 once validated, providing a secure and validated cache.

When the processor writes data in the AIC cache 302, the data is treated analogously to prior art cached data. When the cache is flushed, a store line request is sent to the AP 304. The AP 304 calculates the MAC tag and stores it along with the data in unsecured memory 105.

As an example, a smart phone executes several applications. One application is a weather forecast application which does not require security; another application is a payment application which requires security. The system selectively defines which application executes securely. For example, the unsecure applications rely on a first cache memory and the secure applications rely on another cache memory. Alternatively, the cache controller ensures that there is no contamination between secure and insecure data within the cache. Further alternatively, the cache is divided into a secure portion and an insecure portion.

For security, the payment application software is stored in an encrypted form allowing authentication. For example, it is digitally signed allowing for verification of both the origin and the content of the software. When it is stored on the phone, it is validated using a key that is accessible, for example, to the AIC located within the phone CPU. When the application is executed, it is validated and optionally decrypted by the AIC as the lines of code to be executed are retrieved and stored within the secured cache 302 for processing 101. The weather application is not secured and therefore does not get validated. It is retrieved and provided to the CPU for execution.

As another embodiment, the AIC cache system is associated with processor 101, which needs to read/write secure data. For reading of secure data, the data is validated by the AP 304, optionally decrypted, and stored in the AIC cache 302 for use by the processor 101. For writing of secure data, the processor 101 stores data within the AIC cache 302, which then causes the data to be copied into the external memory. During copying of the data the AP 304 is called to compute a cache line MAC and to store the cache line within external storage, optionally encrypting it. Further, the AP 304 stores corresponding MAC in association with the cache line. In some embodiments, the MAC is stored in the external storage. In other embodiments, the MAC is stored within an indexed table separate from the external storage, for example within internal storage. In yet other embodiments the MAC is stored within an indexed table within separate storage. In a different embodiment the AIC Cache 302 defers requesting AP 304 to store the cache line within external memory until a later point in time, for example in accordance with a cache controller process in execution, instead of storing the cache lines with every processor 101 write request.

Numerous other embodiments may be envisaged without departing from the spirit or scope of the invention.

What is claimed is:

1. A secure memory access system comprising:
an integrated circuit chip comprising:
an advanced integrity controller (AIC) comprising:
a cache memory comprising blocks of executable instructions; and
an authentication processor coupled to the cache memory, the authentication processor having circuitry for controlling the caching of executable instructions within the cache memory, including receiving a read data request for executable instructions, if a cache miss occurs, retrieving a block of unauthenticated encrypted executable instructions together with retrieval of an unencrypted message authentication code (MAC) tag, decrypting the received instructions, authenticating the unauthenticated executable instructions using the unencrypted MAC tag retrieved from the cache memory, and storing the executable instructions in the cache memory; and
a central processing unit (CPU) coupled to the AIC, the CPU providing the authentication processor with a read data request, executing instructions from the cache memory if the requested data had been previously successfully authenticated by the authentication processor and after decryption of the authenticated instructions by the authentication processor; and
an unsecured first memory coupled to the integrated circuit chip, the first memory comprising unencrypted MAC tags stored therein and blocks of authenticated and encrypted executable instructions stored therein, each block of instructions associated with one of the unencrypted MAC tags, the unencrypted MAC tags being used by the authentication processor for authentication of the block of executable instructions.

2. A secure memory access system according to claim 1 further comprising an indexing circuit for indexing the MAC tags to associate the MAC tags with a corresponding block of encrypted executable instructions, the indexed MAC tags being stored within the cache memory.

3. A secure memory access system according to claim 1 further comprising an indexing circuit for indexing the MAC tags to associate the MAC tags with a corresponding block of encrypted executable instructions, the indexed MAC tags being stored within the first memory.

4. A secure memory access system according to claim 1 wherein the blocks of authenticated and encrypted executable instructions are sized for being cached such that the blocks of authenticated and encrypted executable instructions occupy within the cache memory less than one fourth of the storage space therein.

5. A secure memory access system according to claim 1 further comprising a cache flushing circuit for, automatically at intervals, encrypting blocks of executable instructions present within the cache memory, generating MAC tags for each block of encrypted executable instructions and storing the encrypted executable instructions and associated MAC tags in the unsecured first memory.

6. A secure memory access system according to claim 1 comprising a cache flushing circuit for, in response to a flush event, encrypting blocks of executable instructions present within the cache memory, generating MAC tags for each block of encrypted executable instructions and storing the encrypted executable instructions and associated MAC tags in the unsecured first memory.

* * * * *